United States Patent
Ohnishi et al.

[11] Patent Number: 5,889,766
[45] Date of Patent: Mar. 30, 1999

[54] TRANSMISSION/RECEPTION METHOD BASED ON FREQUENCY DIVISION MULTIPLE ACCESS HAVING CHANGEABLE COMMUNICATION CHANNEL BANDWIDTHS AND COMMUNICATION APPARATUS EMPLOYING THE METHOD

[75] Inventors: Makoto Ohnishi, Tokyo; Yukinari Fujiwara, Musashimurayama, both of Japan

[73] Assignee: Hitachi Denshi Kabushiki Kaisha, Tokyo, Japan

[21] Appl. No.: 783,200

[22] Filed: Jan. 14, 1997

[30] Foreign Application Priority Data

Jan. 19, 1996 [JP] Japan .................................. 8-006927

[51] Int. Cl.$^6$ ........................................................ H04J 4/00
[52] U.S. Cl. ........................................... 370/307; 370/478
[58] Field of Search .................................... 370/307, 478, 370/319, 321, 323, 465, 337

[56] References Cited

U.S. PATENT DOCUMENTS

| | | | |
|---|---|---|---|
| 4,199,660 | 4/1980 | Dill et al. | 370/307 |
| 4,510,598 | 4/1985 | Gockler et al. | 370/307 |
| 4,759,013 | 7/1988 | Ichiyoshi | 370/307 |
| 4,813,035 | 3/1989 | Bishop et al. | 370/307 |
| 5,274,627 | 12/1993 | De Santis | 370/307 |
| 5,608,724 | 3/1997 | Green, Jr. | 370/307 |
| 5,625,624 | 4/1997 | Rosen et al. | 370/307 |

FOREIGN PATENT DOCUMENTS

A-1-117437   5/1989   Japan .

OTHER PUBLICATIONS

"Application of Digital Procesing", Institute of Electronics and Communication Engineers of Japan, Chap. 5 pp. 121–134, 1981.

*Primary Examiner*—Jeffery A. Hoffsass
*Assistant Examiner*—Mitchell Slavitt
*Attorney, Agent, or Firm*—Antonelli, Terry, Stout & Kraus, LLP

[57] ABSTRACT

An FDMA (Frequency-Division Multiple Access) transmitter-receiver for use in an FDMA communication system which is capable of changing a bandwidth of a channel as required. The FDMA transmitter-receiver includes: a plurality of trans-demultiplexers which are different in the number of channel multiplexings from each other and each of which serves to convert the received FDMA signal into a TDMA signal; a communication signal demultiplexing/multiplexing circuit for subjecting the output communication channel signals from the trans-demultiplexers to demultiplex and channel-reassignable multiplex them; a plurality of trans-multiplexers which are provided in correspondence to the plurality of trans-demultiplexers and each of which serves to convert the output channel signal after demultiplexing and remultiplexing from the associated communication signal demultiplexing/multiplexing circuit into an FDMA signal; an adder for adding the FDMA signals outputted from the trans-multiplexers; and a transmission circuit connected to an output of the adder for transmitting therefrom the signal which has been obtained by adding the FDMA signals. The bandwidth per channel of each of the trans-demultiplexers and the trans-multiplexers is different in correspondence to the number of channel multiplexing.

9 Claims, 8 Drawing Sheets

TRANSMISSION/RECEPTION METHOD BASED ON FREQUENCY DIVISION MULTIPLE ACCESS HAVING CHANGEABLE COMMUNICATION CHANNEL BANDWIDTHS AND COMMUNICATION APPARATUS EMPLOYING THE METHOD

BACKGROUND OF THE INVENTION

1. Field of the Invention

The present invention relates in general to an FDMA (Frequency Division Multiple Access) transmitter-receiver and more particularly to an FDMA transmission/reception method for use in a digital radio communication system which is capable of changing a communication channel bandwidth, and a transmitter-receiver employing the FDMA transmission/reception method.

2. Description of the Related Art

A digital radio communication system is generally designed in such a way that a plurality of local stations transmit/receive the respective radio waves to/from a base station and the communication is established between the local stations via the base station. Therefore, the base station needs to multiplex the signals on all the call channels or communication channels which are assigned to the communication system of interest in order to transmit/receive the resultant radio wave. As such multiplexing communication methods, there are known the Time Division Multiple Access (hereinafter, referred to as "a TDMA" for short, when applicable) method in which multiplexing is carried out in time domain and the Frequency Division Multiple Access (hereinafter, referred to as "an FDMA" for short, when applicable) method in which multiplexing is carried out in frequency domain.

On the other hand, the promotion of the multi-media in recent years results in the demand of carrying out communication between terminals having various data rates being developed. In order to cope with the promotion of the multi-media, it is desired that the rate of data which can be transmitted/received by the communication system can be changed.

SUMMARY OF THE INVENTION

In the above-mentioned TDMA method, since the call channels or communication channels are assigned in time domain, it is relatively easy to set the call channels having the different data rates. On the other hand, in the above-mentioned FDMA method, since multiplexing is carried out in frequency domain, it is necessary to provide a demultiplexing filter for every channel. In addition, in order to cope with the variable data rate, it is required that a plurality of filter banks having different bandwidths corresponding to the various data rates are prepared and also switching control is carried out so as for the frequency ranges of the channels not to overlap each other. In order to achieve the switching function in the FDMA method, frequency conversion needs to be carried out multiple times. As a result, the hardware scale becomes large and also the control thereof becomes necessarily complicated.

In the light of the foregoing problems associated with the prior art, it is therefore an object of the present invention to provide a transmission/reception method and a communication apparatus employing the method for use in a communication system of an FDMA mode which is capable of changing bandwidths of call channels or communication channels.

It is another object of the present invention to provide a communication system of an FDMA mode which is capable of changing bandwidth of call channels or communication channels.

It is still another object of the present invention to provide a channel switching method for use in an FDMA communication system.

In order to attain the above-mentioned objects, it is a concentrable method that a plurality of filter banks constituted by band-pass filters having different bandwidths are prepared, and these filter banks are switched. In this connection, since an amount of hardwares is increased if those filter banks are constructed in a usual manner, in the present invention, a trans-multiplexer (hereinafter, referred to as "a TMUX" for short, when applicable) is employed.

The FDM-TDM conversion as a reverse operation is realized by a trans-demultiplexer (hereinafter, referred to as "a TDMUX" for short, when applicable) in which the structure of the TMUX is reversed. If the number of channel multiplexings is changed in both the TMUXs and the TDMUXs while maintaining a sampling frequency fs constant, it is possible to construct the filter banks having different passband-widths.

Specifically, an FDMA mode transmitter-receiver according to one aspect of the present invention is arranged such that an FDMA signal from a reception circuit is converted to a time-division multiple access signal stream (hereinafter referred to as TDMA signal stream) by a TDMUX, the TDMA signal stream received is demultiplexed by a channel signal demultiplexing/multiplexing circuit connected to receive the TDMA signal stream from the TDMUX in order to extract a signal on each communication channel and the signals thus extracted are channel-reassignably remultiplexed to produce a different TDMA signal stream. The different TDMA signal stream is received by a TMUX by which the different TDMA signal is converted to a different FDMA signal.

More specifically, for example, the FDMA multiple signal which has been received, is converted into TDMA signal streams by a plurality of TDMUXs having different passband-widths. The signals on the channels in communication are extracted from each of the TDMA signal streams on the basis of information contained in the signal on a control channel and fed to the TMUXs having corresponding passband-widths. In the TMUXs, the TDMA signals are converted into FDMA signals. In such a way, the FDMA signals which have been produced by conversion in a plurality of the TMUXs are added and multiplexed in order to be transmitted.

As described above, when constructing a plurality of filter banks having different passband-widths, by employing TMUXs and TDMUXs, configuration can be made simpler as compared with the case where discrete filters are combined with each other, and hence an amount of hardwares can be reduced. In addition, since the control of changing the passband-width can be carried out in the TDMA signal domain, such control can be more readily processed as compared with the case where the control of changing the passband-width is carried out in the FDMA signal domain, and in addition thereto, it is possible to realize a switching function.

BRIEF DESCRIPTION OF THE DRAWINGS

The above and other objects as well as advantages of the present invention will become clear by the following description of the preferred embodiments of the present invention with reference to the accompanying drawings, wherein.

DESCRIPTION OF THE PREFERRED EMBODIMENTS

The preferred embodiments of the present invention will hereinafter be described in detail with reference to the accompanying drawings.

Figure 1:
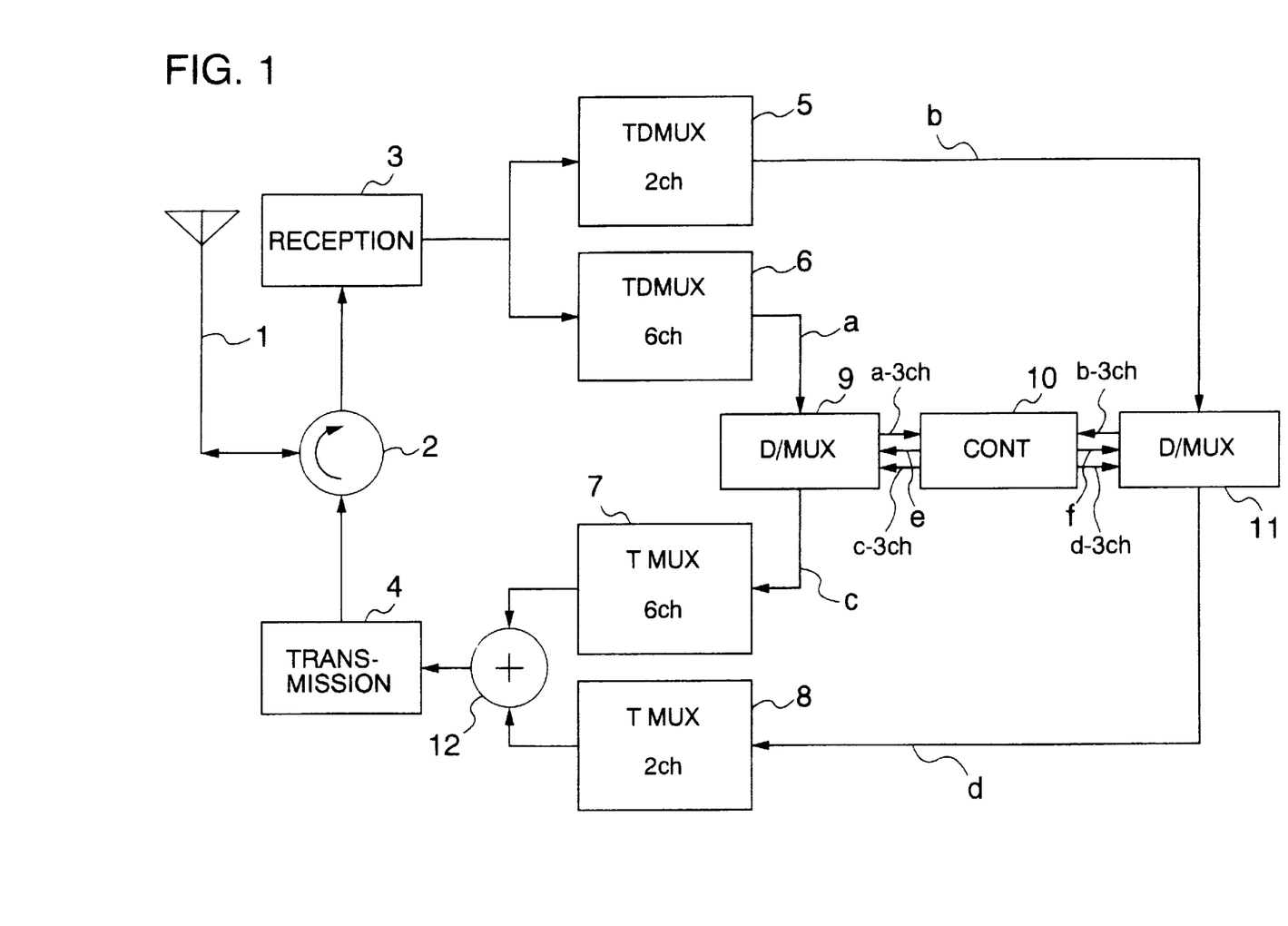
FIG. 1 is a block diagram showing a configuration of an FDMA transmitter-receiver of an embodiment according to the present invention.

Referring first to FIG. 1, there is illustrated a block diagram showing a configuration of an embodiment in which an FDMA transmitter-receiver of the present invention is applied to a communication apparatus for a base station of an FDMA radio communication system.

In the figure, reference numeral 1 designates a transmission/reception antenna; reference numeral 2, a circulator; reference numeral 3, a reception circuit; reference numeral 4, a transmission circuit; reference numeral 5, a TDMUX for two-channel multiplexing, for example; reference numeral 6, a TDMUX for six-channel multiplexing, for example; reference numeral 7, a TMUX for six-channel multiplexing, for example; reference numeral 8, a TMUX for two-channel multiplexing, for example, reference numerals 9 and 11, call signal demultiplexing/multiplexing circuits; reference numeral 10, a call control circuit; and 12, an adder. The TDMUXs 5 and 6 and the TMUXs 7 and 8 may have at least one channel, respectively.

Call signals which have been respectively transmitted from a plurality of local stations are received through the transmission/reception antenna 1 so as to be inputted to the reception circuit 3 through the circulator 2. The reception circuit 3 receives in a lump all the signals (which are different in frequency from one another and are received in the form of frequency-division multiplexing) from a plurality of local stations in order to frequency-convert all the signals having high frequency bands to an FDMA multiple signal having a base band. On the other hand, an FDMA multiple signal which will be transmitted from the base station to a plurality of local stations on the reception side is converted from the signal having the base band to signals having higher frequency bands in order to be transmitted through the transmission/reception antenna 1 via the circulator 2.

Now, before the description proceeds to the operation of the FDMA transmitter-receiver shown in FIG. 1, both the TMUX and the TDMUX which are employed in the present invention will hereinbelow be described in detail.

The TMUX is a device which serves to convert a time division multiple (TDM) signal stream into a frequency division multiple (FDM) signal without involving a demultiplexing process. As for the known examples relating thereto, there are "A Modulation Type Converter" disclosed in JP-A-1-117437, and the like for example.

While the principle of the TMUX is described in detail in JP-A-1-117437 and an article of "Application of Digital Signal Processing" edited by THE INSTITUTE OF ELECTRONICS AND COMMUNICATION ENGINEERS OF JAPAN, Chapter 5 (Signal Conversion Processing in Communication), pp.121 to 134 (issued on 1981), the main points thereof will hereinbelow be described with reference to FIG. 3.

The TMUX can also be considered to be a technology for constructing filter banks in which the passband characteristics are identical to each other and the central frequencies are arranged at fixed intervals. Since quadrature modulation wave signals are handled here, all signals are treated as complex signals. For the frequency shift carried out in the TDM-FDM conversion, both a sampling frequency fs (as an example, this sampling frequency fs is, with the channel width of 6.25 kHz, 37.5 kHz for the six channel multiplexing) and a shift frequency fk of each channel are selected so as to fulfill the relationship of fk=k~fs/M (refer to FIG. 3(b)) where M represents the number of channel multiplexing. A signal spectrum of each of the channels of the input TDMA signal stream is as shown in FIG. 3(a). Then, let us consider that the signal spectrum is frequency-shifted to a channel k of the FDMA signal as indicated by a dotted line as shown in FIG. 3(a). If the TDMA signal stream is demultiplexed through a demultiplexing switching circuit, then the sampling frequency is decreased down to fB=fs/M, and alias components appear as indicated by a dotted line of FIG. 3(b). The frequency component to be shifted (i.e., the signal on the channel k indicated by a solid line) has only to be extracted among these alias components.

Figure 3:
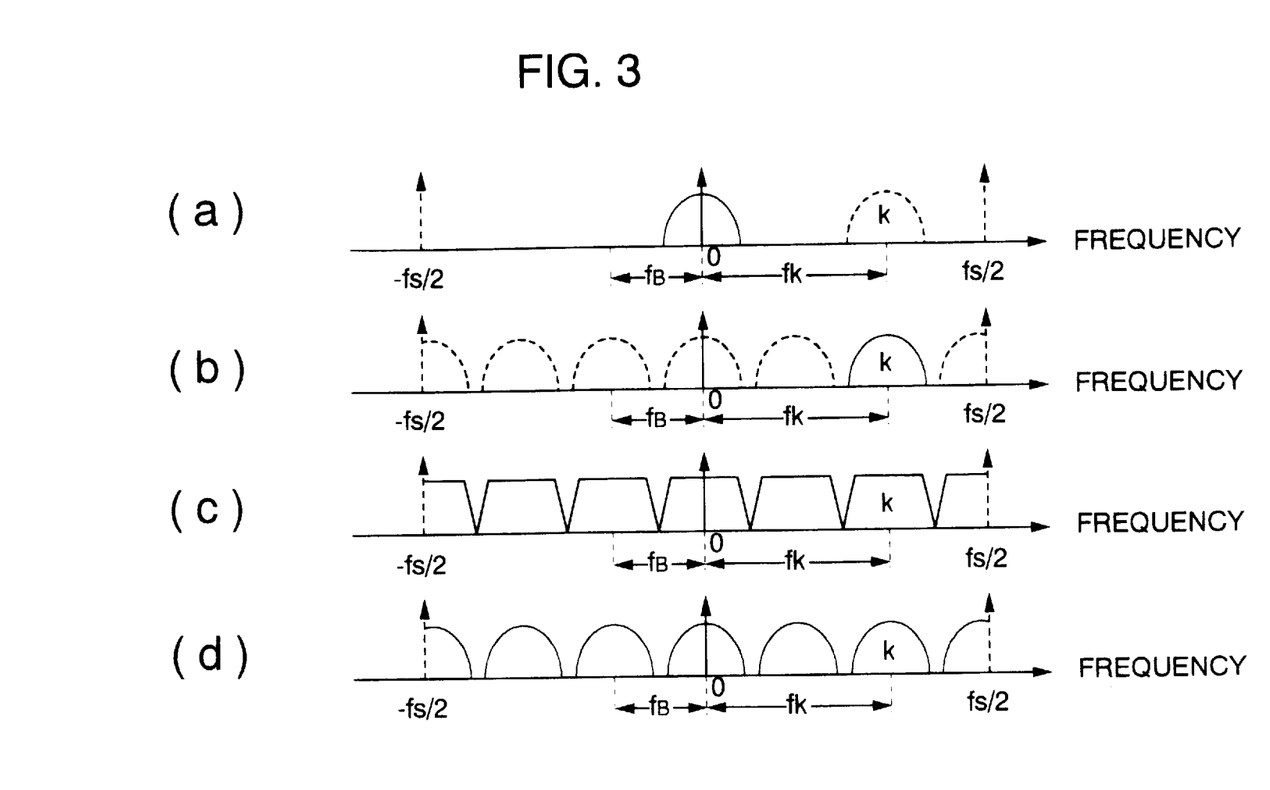
FIG. 3 is a schematic view useful in explaining the principle of a trans-multiplexer employed in the present invention.

Next, the filter banks are comprised of a group of band-pass filters which have the same passband width fB and in which the respective central frequencies are separated at intervals of fB (refer to FIG. 3(c)). Therefore, the frequency characteristics of the k-th filter Hk(z) are obtained by shifting the frequency characteristics of the original filter Ho(z) having the same frequency characteristics by the frequency of k~fB, and hence can be expressed by the following expression (1):

$$\exp(j2\pi(f - kf_B)/f_S) = z \cdot \exp(-j2\pi kf_B/f_S) \quad (1)$$
$$= z \cdot \exp(-2\pi k/M)$$
$$= z \cdot W^k$$

where $W=\exp(-j2\pi/M)$. This expression (1) is obtained in such a way that f in a delay operator $z=\exp(j2\pi f/f_S)$ of the original filter Ho(z) is replaced with (f−k~fB). That is, an expression (2) is established.

$$H_k(z)=H_0(zW^k) \quad \ldots (2)$$

Now, an arbitrary filter can be expressed by an expression (3) on the basis of a poliphase filter which has the sampling frequency divided by M.

$$H(z)=\Sigma H^i(z^M)z^{-i} \quad \ldots (3)$$

As a result, by poliphase-decomposing the k-th filter Hk(z) and also using the relationship of an amount of frequency shift of k~fB, the following expression is obtained.

$$Hk(z) = \Sigma H_k i(z^M) z^{-i} = H_o^i(-z^M) z^{-i} W^{-ik} \quad \ldots (4)$$

where $W^{-ik} = \exp(j2\Sigma ik/M)$ ... (5).

Then, all the output signals from respective k-th filter are added, thereby obtaining the FDMA signal (refer to FIG. 3(d)).

From expression (4), it is clearly understood that the filter bank of the FDMA mode can be realized on the basis of multiplication of the matrix $W^{-ik}$ of expression (5), the poliphase filter (refer to expression (3)) and the delay operator z. Since the multiplication of the matrix $W^{-ik}$ is the butterfly operation used in the FFT (Fast Fourier Transform) by which DFT (Discrete Fourier Transform) can be speedily calculated, the high speed operation can be promoted with the same algorithm. In addition, since all the M poliphase filters which are obtained by expanding the M filter banks are common, reduction of the hardware can be attained.

Figure 4:
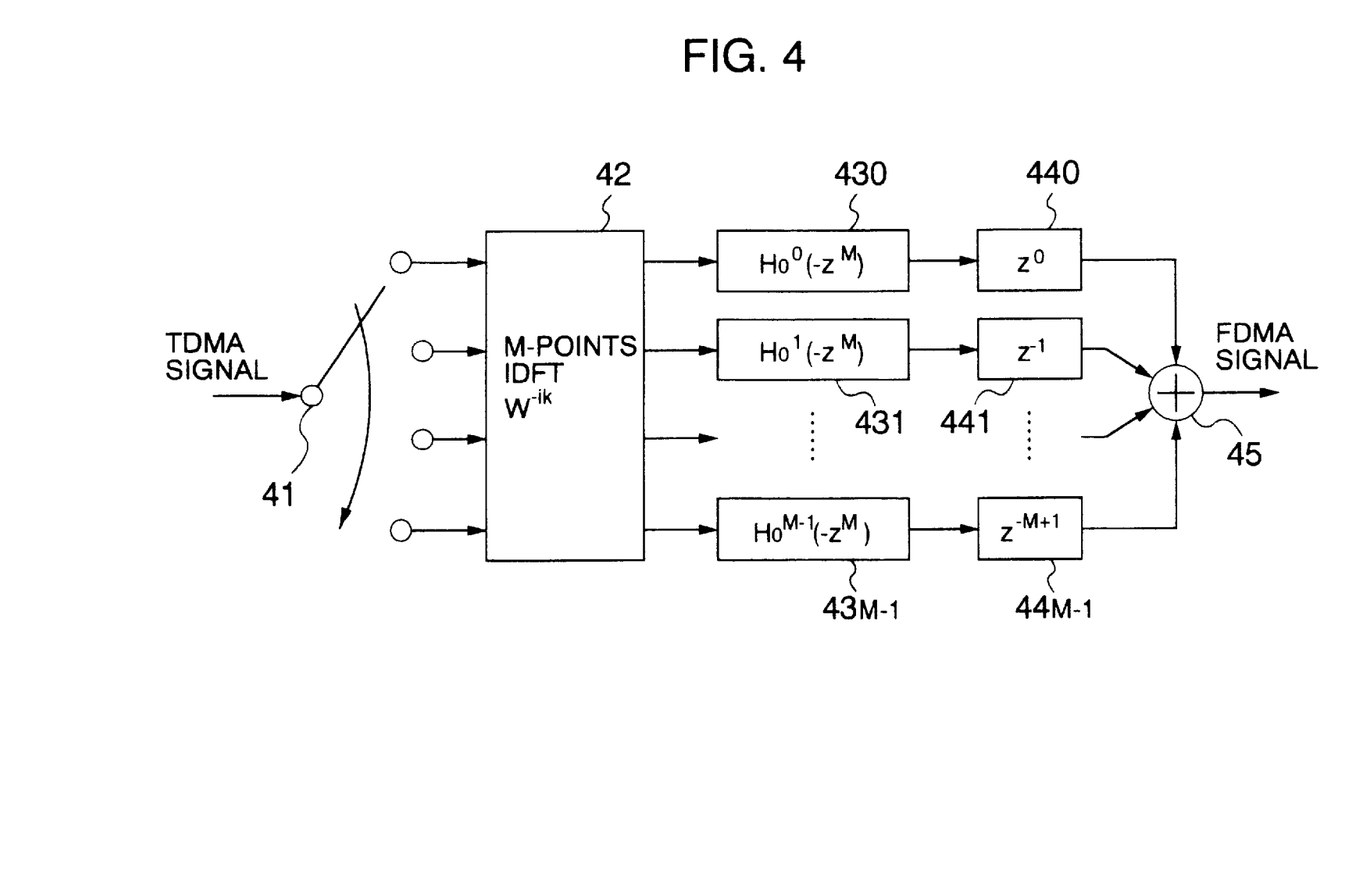
FIG. 4 is a block diagram showing an example of a configuration of the trans-multiplexer shown in FIG. 3.

Thus, it is understood that the TDM-FDM conversion can be realized by the TMUX as shown in FIG. 4. In the figure, reference numeral 41 designates a time division separation switch, reference numeral 42 designates an inverse DFT butterfly operation circuit, reference numerals 430 to 43M-1 designate poliphase filters, respectively, reference numerals 440 to 44M-1 designate delay devices, respectively, and reference numeral 45 designates an adder.

Figure 5:
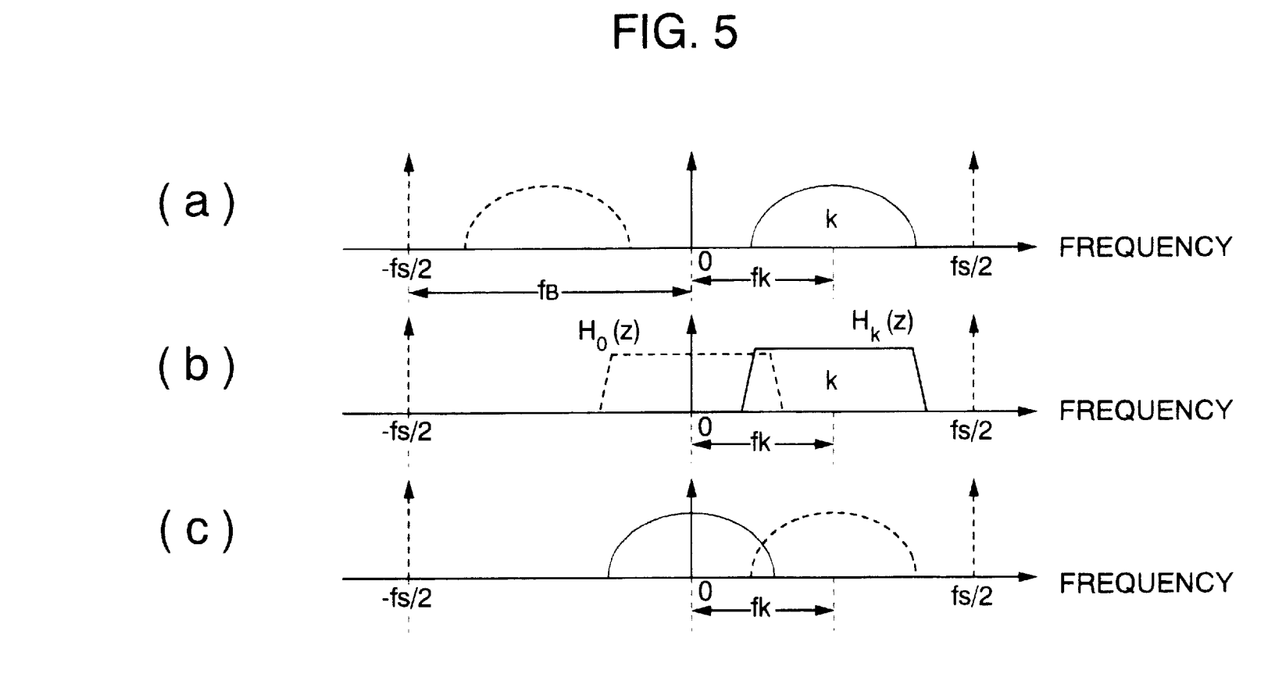
FIG. 5 is a schematic view useful in explaining the principle of a trans-demultiplexer employed in the present invention.

The FDM-TDM conversion as the inverse operation is realized by a TDMUX (trans-demultiplexer) which is obtained by reversing the configuration of the TMUX shown in FIG. 4. But, since all the signals on the k-th channels of the FDMA signal are shifted to d.c. signals (their frequencies are zero), the operation $W^{-ik}$ of the inverse DFT is replaced with the operation $W^{ik}$ of the DFT, and also the order of the poliphase filters and the FFT butterfly operation are reversed. Here, the operation of the trans-demultiplexer will now be described by taking a spectrum view shown in FIG. 5 as an example. FIG. 5 shows an example in which the FDMA signals on two channels are converted into the TDMA signal. In order to extract the signal on the k-th channel of the FDMA signal (refer to FIG. 5(a)), the filter Hk(z) which has the frequency characteristics indicated by a solid line in FIG. 5(b) is employed. The frequency characteristics of the filter Hk(z) are obtained by shifting those of the original filter Ho(z) indicated by a dotted line in FIG. 5(b) by the frequency of fB=fs/2, and hence can be expressed by the following expression:

$$\begin{aligned}
\exp(j2\pi(f + kf_B + f_B/2)/f_S) &= z \cdot \exp(j2\pi k f_B/f_S + j\pi f_B/f_S) \quad (6) \\
&= z \cdot \exp(j2\pi k/M) \cdot \exp(j\pi/M) \\
&= z \cdot W^{-k} \cdot \exp(j\pi/M)
\end{aligned}$$

where $W = \exp(-j2\pi/M)$. That is, expression (6) is obtained in such a way that f in the delay operation $z = \exp(j2\pi f/fs)$ of the original filter Ho(z) is replaced with $(f+(k+½))\cdot fB$.

A point of difference of expression (6) from expression (1) is that the term of $\exp(j\pi/M)$ is additionally contained therein. This results from that an amount of frequency shift is equal to half the frequency interval fB of the filter bank. By substituting expression (6) into expression (3), an expression (7) is obtained, instead of the expression (4) in the case of the TMUX.

$$Hk(z) = \Sigma H_k^i(z^M) Z^{-i} = \Sigma H_0^i(-z^M) \sim z^{-i} \sim W^{ik} \sim \exp(j\pi i/M) \quad \ldots (7)$$

The output signal from each k-th filter has the spectrum indicated by a dotted line in FIG. 5(c) and it is shifted to a d.c. signal (its frequency is zero) with the DFT operation $W^{ik}$.

Figure 6:
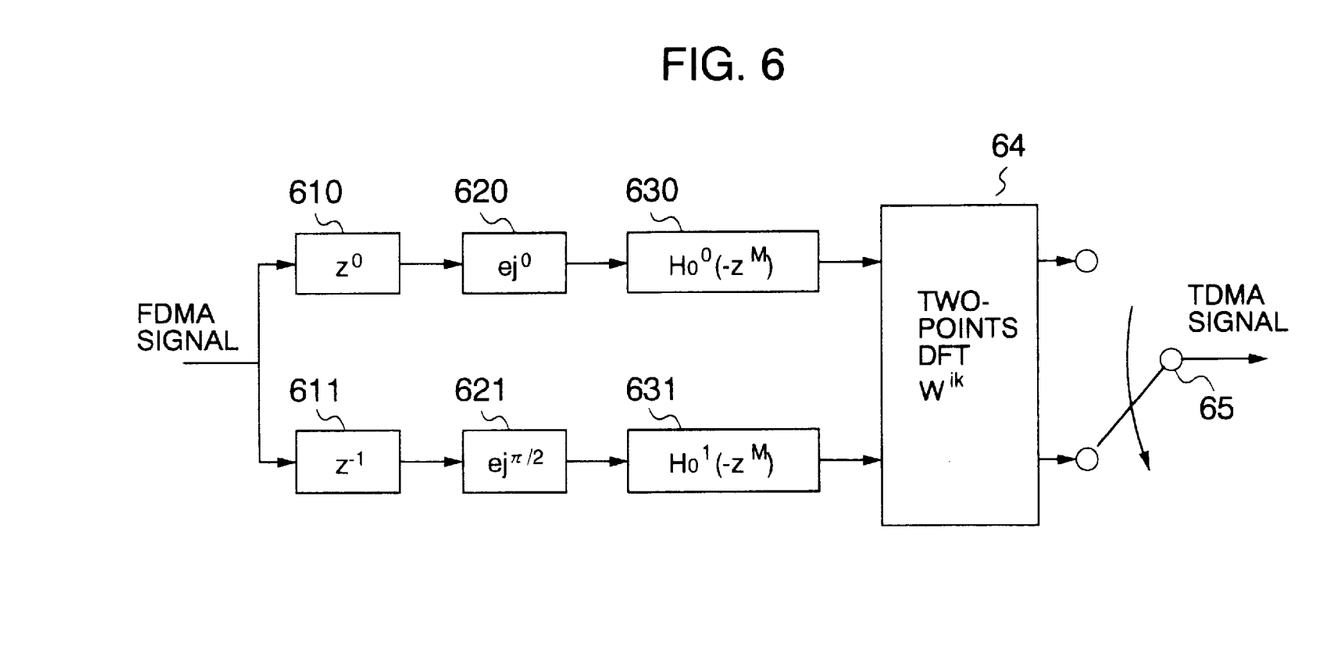
FIG. 6 is a block diagram showing an example of a configuration of the trans-demultiplexer shown in FIG. 5.

The TDMUX as discussed above can be configured as shown in FIG. 6. In the figure, reference numerals 610 and 611 designate delay devices, respectively, reference numerals 620 and 621 designate phase rotation circuits, respectively, reference numerals 630 and 631 designate poliphase filters, respectively, reference numeral 64 designates a DFT butterfly operation circuit, and reference numeral 65 designates a time division multiple switch.

Then, if the number of channel multiplexing is changed with both the above-mentioned TMUXs and TDMUXs while maintaining the sampling frequency fs constant, then the filter banks having different passband-widths can be constructed. Then, the FDMA multiple signal which has been received is converted into TDMA signal streams by a plurality of TDMUXs having different passband-widths. Signal on channels in communication are extracted on the basis of the information contained in the signal on the control channel in order to be transmitted to the TMUXs having corresponding passband-width. In the TMUXs, the TDMA signal streams are converted into FDMA signals. The FDMA signals which have thus been obtained by the conversion in a plurality of the TMUXs are added and multiplexed so as to be transmitted.

Next, an embodiment of the present invention will hereinbelow be described with reference to FIGS. 1 and 2. Note that the outline of the configuration of the FDMA transmitter-receiver shown in FIG. 1 is as already described above.

Figure 2:
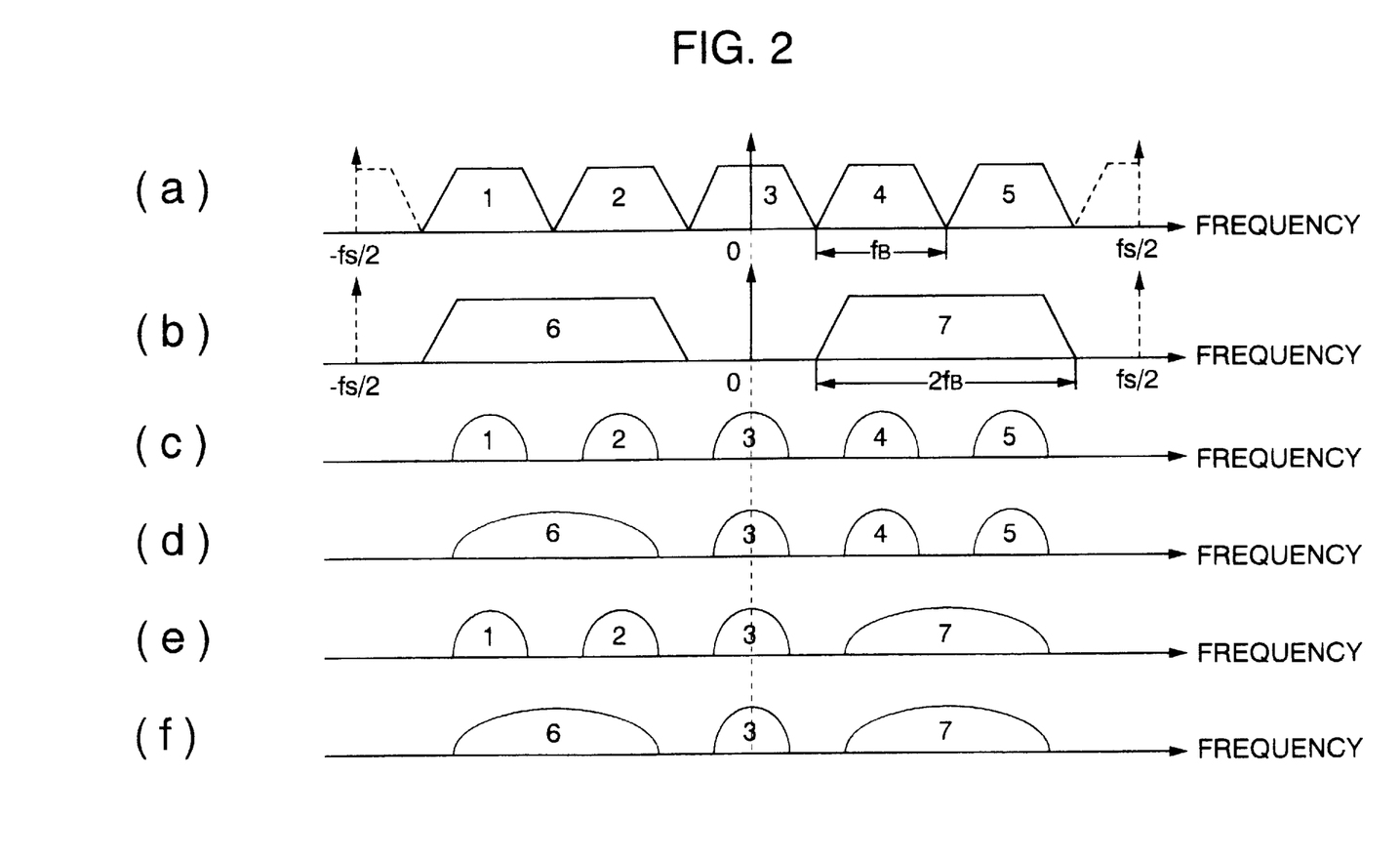
FIG. 2 is a spectrum view useful in explaining the operation of the FDMA transmitter-receiver of the embodiment shown in FIG. 1.

Referring to FIG. 2, there is illustrated a spectrum view useful in explaining the operation of the present embodiment shown in FIG. 1. Firstly, the arrangement of the communication channels of the present embodiment will be described with reference to FIG. 2.

The frequency characteristics of the filter bank constituted by both the TDMUX 6 and the TMUX 7 are shown in FIG. 2(a). Five communication channels are respectively provided by the band-pass filters each having the passband-width fB. While the sampling frequency fs of the TMUX is given by fs=6~fB and hence the six communication channels can be set, the 6-th channel is not used. Next, the frequency characteristics of both the TDMUX 5 and the TMUX 8 are shown in FIG. 2(b). As apparent from FIG. 2(b), two band-pass filters each having the passband-width 2fB are provided. By adopting the frequency arrangement as described above, it is possible to set the channels ranging from the first channel up to the seventh channel as shown in FIGS. 2(a) and 2(b). The arrangement of the communication channels which is available to the FDMA communication system of the present embodiment is shown in FIGS. 2(c), 2(d), 2(e) and 2(f), respectively. Note that the channels 1 and 2 and channel 6 can not be used at the same time. In addition, the channels 4 and 5 and channel 7 also can not be used at the same time. The channel 3 can be used in even any channel arrangements. For this reason, the channel 3 is used as the control channel for the FDMA communication system.

Next, the description will hereinbelow be given by taking the situation in which in the embodiment shown in FIG. 1, both channels 1 and 4 are in use, and a local station A (not shown) using the channel 1 doubles the communication bandwidth (e.g., when communication is switched from speech signals to higher rate data of a facsimile, a computer or the like), as an example with reference to FIGS. 1 and 8.

Figure 8:
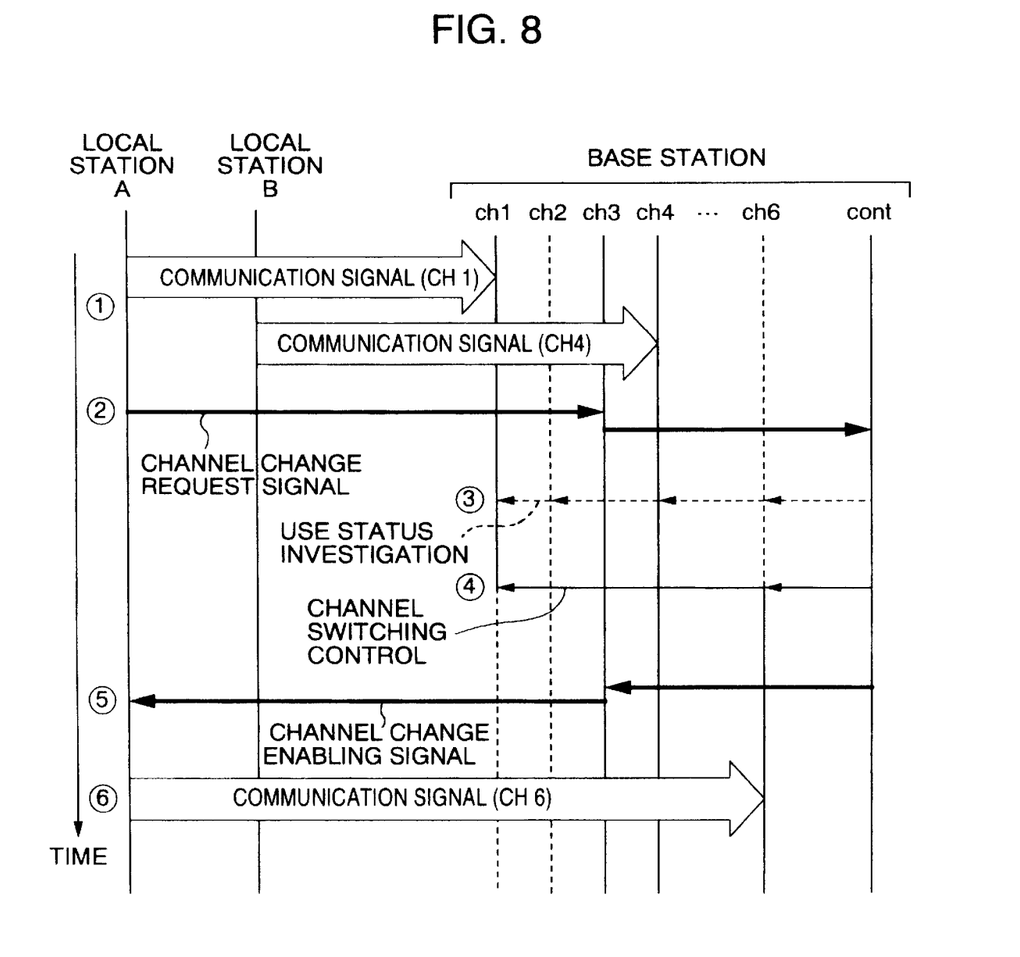
FIG. 8 is a schematic view of a sequence of transmitting/receiving a signal which is useful in explaining the operation in the case where a call bandwidth of a local station is changed in the communication system of an embodiment according to the present invention.

FIG. 8 is a sequence diagram of a signal transmission/reception in the situation described above. In the figure, time elapses from upper to lower. In Step 1, both the communication signal on the channel 1 from the local station A and the communication signal on the channel 4 from the local station B are respectively transmitted to the base station. In the apparatus of the base station, both the signal on the channel 1 and the signal on the channel 4 are converted into a TDMA signal stream by the TDMUX 6, demultiplexed into signals corresponding to the associated channels and remultiplexed by the call signal demultiplexing/multiplexing circuit 9, and are constructed into an FDMA signal again by the TMUX 7 so as to be transmitted through the transmission/reception antenna 1. In FIG. 8, channel 1, channel 2 and channel 3 indicated by respective solid lines represent that the apparatus of the base station is in operation with respect to channels 1, 2 and 3, and also channel 2 and channel 6 indicated by respective broken lines mean that the apparatus is in pause with respect to the channels 2 and 6 and hence no communication channel is set.

Then, in Step 2, the local station A sends a channel change request to the base station through the control channel (channel 3). The base station transmits the control signal on the channel 3 which has been outputted from the TDMUX 6 to the call control circuit 10 (cont), and checks the use status of the channels in Step 3. If it is judged from the use status of the channels that circuit assignment change is possible, then the control of channel switching is carried out in Step 4 so as to control both the communication signal demultiplexing/multiplexing circuits 9 and 11 to inhibit the use of the channel 1 and prepare for use of the channel 6. After completion of the preparation therefor, in Step 5, the base station transmits a channel change enabling signal to the local station A through the control channel (channel 3). In response to the channel change enabling signal, in Step 6, the local station A establishes the communication with the base station through the channel 6. The signal which has been received by the base station through the channel 6 is outputted through the TDMUX 5. The signal is sent to the TMUX 8 through the communication signal demultiplexing/multiplexing circuit 11, thereby completing the operation of changing the communication bandwidth of the local station A.

Next, the detailed description will herein-below be given with respect to both the configurations and operations of the communication signal demultiplexing/multiplexing circuits 9 and 11, and the call control circuit 10 with reference to FIG. 7.

Figure 7:
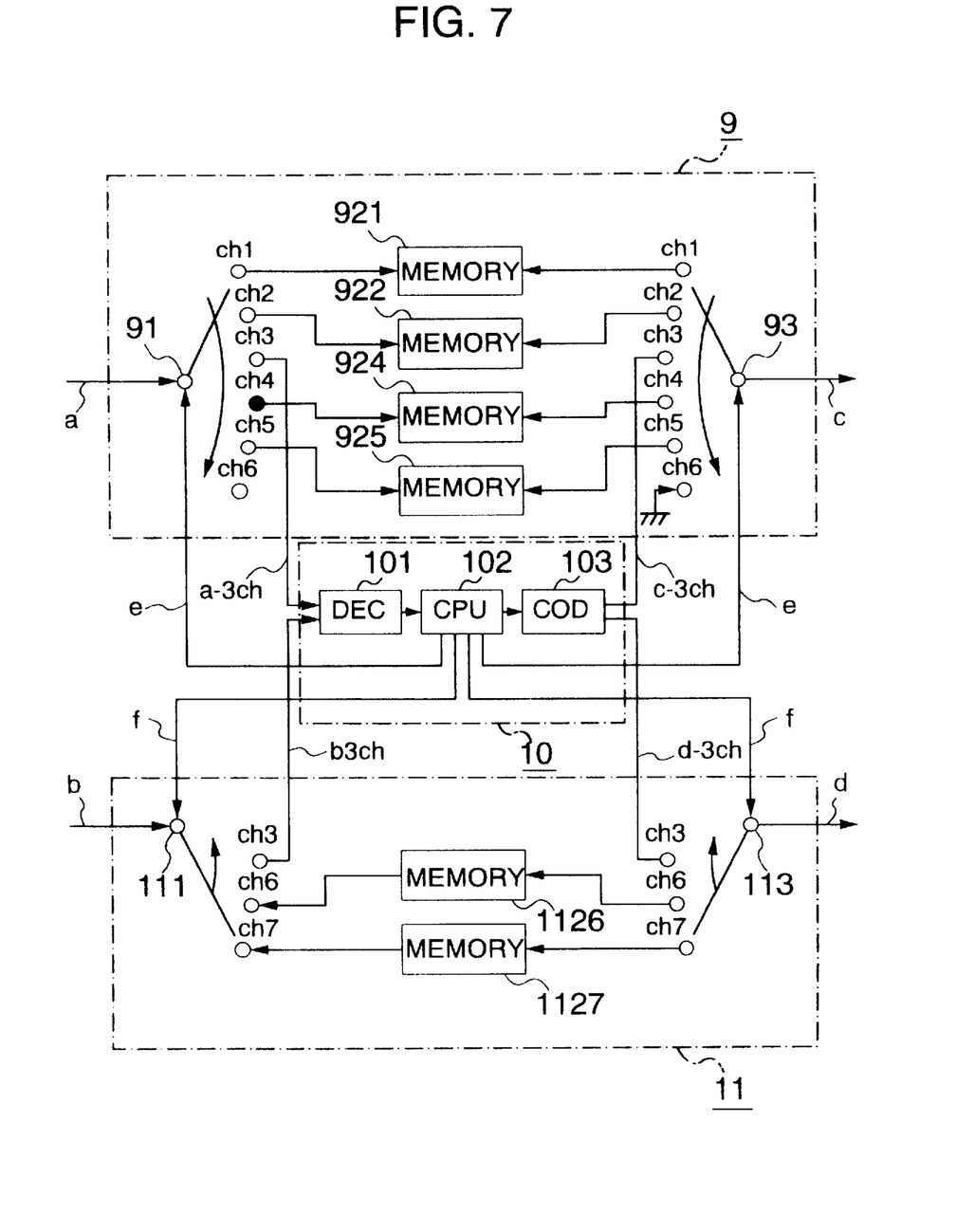
FIG. 7 is a block diagram, partly in circuit diagram, showing an example of a configuration of a communication signal demultiplexing/multiplexing circuit and a call control circuit which are employed in the present invention.

FIG. 7 is a block diagram showing the configurations of the communication signal demultiplexing/multiplexing circuits 9 and 11 and the call control circuit 10.

In FIG. 7, reference numeral 91 designates a time division separation switch, reference numerals 921, 922, 924 and 925 designate memories, respectively, and reference numeral 93 designates a time division multiple switch. The communication signal demultiplexing/multiplexing circuit 9 is constituted by these constituent elements.

Reference numeral 111 designates a time division separation switch, reference numerals 1126 and 1127 designate memories, respectively, and reference numeral 113 designates a time division multiple switch. The communication signal demultiplexing/multiplexing circuit 11 is constituted by these constituent elements.

In addition, in FIG. 7, reference numeral 101 designates a decoder circuit, reference numeral 102 designates a CPU, and reference numeral 103 designates a coder circuit. The communication control circuit 10 is constituted by these constituent elements.

Since the signal which is inputted to each of the communication signal demultiplexing/multiplexing circuits is time-division data, switching of channel can be carried out by both the time division separation switch and the memories. For example, the input TDMA signal stream which has been inputted to the communication signal demultiplexing/multiplexing circuit 9 is separated into signals on the respective channels by the time division separation switch 91. Since the signal on the channel 3 is the control signal, it is inputted to the decoder circuit 101 in order to separate data sent from the associated local station so as to be inputted to the CPU 102. The CPU 102 monitors the assignment status of the multiple communication signal at all times so as to control both the time division switches 91 and 93, and carries out the switching of channel with respect to the communication signal as required. In addition, the CPU 102 sends the channel assignment enabling signal onto the channel 3 through the coder circuit 103 in order to integratedly control calls among the local stations.

The above-mentioned operation of the communication signal demultiplexing/multiplexing circuit 9 is also substantially applied to the communication signal demultiplexing/multiplexing circuit 11. Therefore, the description thereof will be omitted here for the sake of simplicity.

As described above, since in the present embodiment, the filter bank employed in the FDMA transmitter-receiver which is capable of changing the communication bandwidth is constituted by the TMUXs, it is possible to promote a great reduction in the hardware. In addition, while in the above-mentioned embodiment, description has been given with respect to a specific case where no change of communication channel is required when changing the communication bandwidth, in actuality, communication bandwidth can not be changed if call channel is not changed in many cases. In such cases, switching function of channel changing is required for the base station apparatus. With respect to TDMA signal, by changing only time positions of data, it becomes possible to realize the switching function. On the other hand, with respect to FDMA signal, the frequency needs to be shifted and hence the required configuration will be very complicated. However, in the present invention, since by employing both the TDMUXs and the TMUXs, FDMA signal is converted into TDMA signal, the switching function can also be readily realized, and also it is possible to enhance the use efficiency of the FDMA communication device.

As set forth hereinabove, according to the present invention, in the FDMA communication system which is capable of changing the passband-width of communication channels, a group of filters having different passband-widths can be readily configured with a less amount of hardwares. In addition, since the control of switching the filter and channel switching function can also be readily realized, it is possible to provide an FDMA communication device which is very excellent in adaptability. While in the embodiment, the description is given with respect to an example in which the present invention is applied to a base station apparatus of an FDMA radio communication system, it is to be understood that the present invention is not limited to the radio communication. In addition, it is to be understood that the present invention can be applied not only to a terminal for a local station but also to a base station.

Furthermore, since in the present invention, the overall FDMA transmitter-receiver can be realized on the basis of the digital signal processings, it is suitable for implementation in LSI. As a result, miniaturization of the apparatus, lower power consumption and lower cost can also be readily promoted.

While the present invention has been particularly shown and described with reference to the preferred embodiments and the specified modifications thereof, it will be understood that the various changes and other modifications will occur to those skilled in the art without departing from the scope and true spirit of the invention. The scope of the invention is therefore to be determined solely by the appended claims.

What is claimed is:

1. A frequency-division multiple access (FDMA) transmitter-receiver for use in FDMA mode communications, comprising:

a reception circuit for receiving an FDMA signal;

a plurality of trans-demultiplexer (TDMUX) connected with said reception circuit for converting said FDMA signal into a time-division multiple access (TDMA) signal stream, said plurality of trans-demultiplexers having different numbers of channel and having different communication channel bandwidths;

a plurality of communication signal demultiplexing/ multiplexing circuits, each of which is so connected with each of said TDMUXs as to receive said TDMA signal stream from said predetermined TDMUX for demultiplexing said TDMA signal, extracting a signal on said communication channel, and channel-reassignably remultiplexing said signals from said communication channels to produce a different TDMA signal stream;

a plurality of trans-multiplexers (TMUX) provided in correspondence to said plurality of TDMUXs, each TMUX being connected to receive the different TDMA signal stream from said predetermined demultiplexing/ multiplexing circuit, for converting said different TDMA signal stream into a different FDMA signal, the number of channel multiplexings and communication channel bandwidth of each said plurality of TMUXs being substantially the same as those of said predetermined one of said TDMUXs;

an adder connected with said plurality of TMUXs; and a transmission circuit connected with said adder.

2. An FDMA transmitter-receiver according to claim 1, wherein a frequency arrangement of the communication channels of said FDMA mode communications is constructed by a plurality of channels having respective bandwidths which are integral multiples of a minimum channel bandwidth employed by the FDMA communications, and each of the plurality of bandwidths is set to be substantially equal to any one of the bandwidths for the individual channels of said TDMUXs and said TMUXs.

3. An FDMA transmitter-receiver according to claim 1, further comprising a control circuit which uses at least one channel of the call channels of said FDMA transmitter-receiver as a channel for a control signal, and which controls said communication signal demultiplexing/multiplexing circuit on the basis of information on the channel for the control signal.

4. An FDMA radio communication system wherein said FDMA transmitter-receiver as defined in claim 1 is used as a base station common communication apparatus of an FDMA radio communication system including a plurality of local stations and a base station, and a plurality of call signals transmitted from said plurality of local stations are received through the FDM multiplexing, and after subjecting the call signals thus received to the processing for the call signals by said FDMA transmitter-receiver, the resultant signals are transmitted to the respective local stations on the reception side again.

5. An FDMA transmission/reception method for use in an FDMA mode communication system capable of changing a bandwidth of a channel in use, said method comprising the steps of:

receiving an FDMA signal;

converting said FDMA signal into TDMA signal streams by a plurality of TDMUXs each of which has the number of plural channels and which have different channel bandwidths, respectively;

separating and extracting each signal on said channel in communication from said TDMA signal stream sent from said TDMUX;

channel-reassignably remultiplexing the signals extracted from said TDMA signal streams sent from said TDMUXs, and transmitting each of the remultiplexed signals to said predetermined TMUX which has substantially the same channel bandwidth as the bandwidth of the remultiplexed signal of interest;

converting the remultiplexed signal into a different FDMA signal in each of said TMUXs; and adding all said different FDMA signals in order to transmit the resultant signal.

6. A channel switching method in an FDMA communication system in which communication is carried out such that an FDMA signal containing communication signals on communication channels having various bandwidths sent from local stations and a control signal on a control channel, is received at a base station, the FDMA signal is converted into a plurality of TDMA signal streams in a plurality of TDMUXs which have substantially the same channel bandwidths as the various bandwidths of the communication signals, respectively, and TDMA signal streams each obtained by subjecting one of said plurality of TDMA signal streams to demultiplexing and remultiplexing, are converted into a plurality of FDMA signal streams in a plurality of TMUXs having substantially the same channel bandwidths as the various bandwidths of the communication signals, respectively, and the plurality of FDMA signal streams are added to be transmitted, the number of channel multiplexings of said plurality of TDMUXs being different from one another and the number of channel multiplexings of said plurality of TDMUXs being different from one another, said method comprising the steps of:

transmitting a request for changing a channel in use from a local station, which is in communication through a certain channel, to said base station through the control channel;

checking, in response to the request for changing a channel in use, the use status of the channels by said base station;

inhibiting, when the channel in use can be changed, use of the channel which is being used by the local station, and preparing a different channel which is idle;

transmitting, after completion of the preparation, a channel change enabling signal from said base station to the local station through the control channel;

transmitting, in response to the channel change enabling signal, a communication signal from the local station to said base station through the different channel; and transmitting the call signal which has been received from said base station through the channel.

7. A method according to claim 6, wherein the bandwidth of the certain channel is different from the bandwidth of the different channel.

8. A method according to claim 6, wherein the frequency arrangement of the channels of said FDMA communications is constructed by a plurality of channels having respective bandwidths which are integral multiples of a minimum channel bandwidth used in said system, and each of the plurality of bandwidths is set to be substantially equal to any one of the bandwidths for the individual channels of said TDMUXs and said TMUXs.

9. A frequency-division multiple access (FDMA) transmitter-receiver for use in FDMA mode communications, comprising:

a reception circuit for receiving an FDMA signal;

a trans-demultiplexer (TDMUX) connected to said reception circuit for converting said FDMA signal into a time-division multiple access (TDMA) signal stream;

a demultiplexing/multiplexing circuit connected with said TDMUX to receive said TDMA signal stream, for demultiplexing and remultiplexing said TDMA signal stream to produce a different TDMA signal stream;

a trans-multiplexer (TMUX) connected with said demultiplexing/multiplexing circuit to receive said different TDMA signal stream, for converting said different TDMA signal stream into a different FDMA signal; and a transmission circuit connected with said TMUX to receive said different FDMA signal.

* * * * *